(12) United States Patent
Funahashi (10) Patent No.: US 11,525,484 B2
(45) Date of Patent: Dec. 13, 2022

(54) CONSTANT VELOCITY UNIVERSAL JOINT (71) Applicant: NTN CORPORATION, Osaka (JP)

(72) Inventor: Masashi Funahashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 347 days.

(21) Appl. No.: 16/645,032

(22) PCT Filed: Sep. 26, 2018

(86) PCT No.: PCT/JP2018/035642
§ 371 (c)(1),
(2) Date: Mar. 6, 2020

(87) PCT Pub. No.: WO2019/065715
PCT Pub. Date: Apr. 4, 2019

(65) Prior Publication Data
US 2020/0284301 A1 Sep. 10, 2020

(30) Foreign Application Priority Data

Sep. 28, 2017 (JP) .............................. JP2017-187840

(51) Int. Cl.
*F16D 3/20* (2006.01)
*F16D 1/116* (2006.01)
*F16D 3/223* (2011.01)

(52) U.S. Cl.
CPC ................ *F16D 3/20* (2013.01); *F16D 1/116* (2013.01); *F16D 2003/22323* (2013.01);
(Continued)

(58) Field of Classification Search
CPC .. F16D 3/20; F16D 1/116; F16D 2003/22323; Y10S 403/06; Y10S 464/906; Y10T 403/60
(Continued)

(56) References Cited

U.S. PATENT DOCUMENTS 6,780,114 B2 * 8/2004 Sahashi .................. F16D 1/116
464/906

FOREIGN PATENT DOCUMENTS

JP 2017-137944 8/2017

OTHER PUBLICATIONS

International Search Report dated Dec. 25, 2018 in International (PCT) Application No. PCT/JP2018/035642.
(Continued)

*Primary Examiner* — Greg Binda
(74) *Attorney, Agent, or Firm* — Wenderoth, Lind & Ponack, L.L.P.

(57) ABSTRACT

A constant velocity universal joint includes outer and inner joint members that transmit torque while allowing angular displacement via balls, a power transmission shaft connected to the inner joint member in a torque transmittable manner, and a detachable mechanism between the inner joint member and the power transmission shaft to detach the power transmission shaft from the inner joint member. The detachable mechanism includes a cylindrical member externally fit onto the power transmission shaft, spheres movable in a radial direction in the cylindrical member, and an annular member movable in an axial direction on an outer periphery of the cylindrical member. Locking claws are provided at an end of an inner joint member side of the annular member, and a locking groove is provided at an end of an annular member side of the inner joint member. The locking claws are fitted into the locking groove.

6 Claims, 7 Drawing Sheets

(52) U.S. Cl.
CPC .......... *Y10S 403/06* (2013.01); *Y10S 464/906* (2013.01); *Y10T 403/60* (2015.01)

(58) Field of Classification Search
USPC ........................................................ 464/182
See application file for complete search history.

(56) References Cited

OTHER PUBLICATIONS

International Preliminary Report on Patentability and Written Opinion of the International Searching Authority dated Mar. 31, 2020 in International (PCT) Application No. PCT/JP2018/035642.

* cited by examiner

CONSTANT VELOCITY UNIVERSAL JOINT

TECHNICAL FIELD

The present invention relates to a constant velocity universal joint used in a power transmission system of an automobile or various industrial machines, and particularly incorporated in a propeller shaft for an automobile.

BACKGROUND ART

There are two types of constant velocity universal joints used as means for transmitting a rotational force from an engine of an automobile to wheels at a constant velocity: a fixed type constant velocity universal joint and a plunging type constant velocity universal joint. Both of these constant velocity universal joints have a structure in which two shafts on a driving side and a driven side are connected to each other and can transmit rotational torque at a constant speed even when the two shafts have an operating angle.

A propeller shaft incorporated in an automobile needs to cope with angular displacement and axial displacement due to a change in the relative positional relationship between the transmission and the differential.

For this purpose, in general, a propeller shaft has a structure including a fixed type constant velocity universal joint that allows only angular displacement on the transmission side, and a plunging type constant velocity universal joint that allows both axial displacement and angular displacement on the differential side, in which both the constant velocity universal joints are connected by a propeller shaft.

The fixed type constant velocity universal joint includes an outer joint member, an inner joint member, a plurality of balls, and a cage. A power transmission shaft, which is an output shaft extending from the transmission, is connected to a shaft hole of the inner joint member in a torque transmittable manner by spline fitting. This power transmission shaft is prevented from falling off from the inner joint member by a retaining ring.

Here, for component replacement or maintenance and inspection of the propeller shaft, it is necessary to make the constant velocity universal joint detachable from the power transmission shaft of the transmission.

The present applicant has previously proposed a constant velocity universal joint including a detachable mechanism as disclosed in, for example, Patent Literature 1 as a connection structure between a power transmission shaft and a constant velocity universal joint in this propeller shaft.

The detachable mechanism of Patent Literature 1 has a cylindrical member externally fit onto a power transmission shaft, a retaining ring that is internally inserted into the cylindrical member and is reducible in diameter, a push member disposed to be movable in a radial direction on an outside in the radial direction of the retaining ring, and an annular member disposed to be movable in an axial direction on an outer peripheral surface of the cylindrical member.

In this detachable mechanism, the inner joint member and the power transmission shaft are securely fixed and easily separated by making the retaining ring detachable from the power transmission shaft by causing movement in the radial direction of the push member, which is exposed from the outer peripheral surface of the cylindrical member, by movement in the axial direction of the annular member.

CITATIONS LIST

Patent Literature

Patent Literature 1: JP 2017-137944 A

SUMMARY OF INVENTION

Technical Problems

Incidentally, the detachable mechanism disclosed in Patent Literature 1 has a structure in which a locking groove is provided in the inner joint member and a locking claw is provided on the cylindrical member, and the locking claw of the cylindrical member is fitted in the locking groove of the inner joint member, thereby connecting the inner joint member and the cylindrical member.

As described above, when the structure is employed in which the retaining ring and the push member are internally provided and the locking claw is provided on the cylindrical member disposed between the power transmission shaft and the annular member, there is a concern that the shape of the cylindrical member becomes complicated.

Accordingly, when the cylindrical member having a complicated shape is made of metal, processing cost increases. On the other hand, when the cylindrical member having a complicated shape is made of resin, it is difficult to design for ensuring pull-off resistance of the power transmission shaft.

Further, in the detachable mechanism disclosed in Patent Literature 1, an annular recessed groove is formed in the power transmission shaft, and the retaining ring is fitted in the recessed groove, in order to fix the annular member that is disposed to be movable in the axial direction on the outer peripheral surface of the cylindrical member to the power transmission shaft.

When such an annular member fixing structure is employed, formation of the recessed groove in the power transmission shaft and the retaining ring for restricting the position of the annular member are necessary, and thus there is a possibility of inviting a rise of processing cost and an increase in the number of parts.

Accordingly, the present invention has been proposed in view of the above-described problems, and it is an object thereof to provide a constant velocity universal joint including a detachable mechanism that allows simplifying the shape of a cylindrical member and is capable of fixing an annular member without a retaining ring.

Solutions to Problems

A constant velocity universal joint according to the present invention has a structure that includes an outer joint member, an inner joint member that transmits torque with the outer joint member while allowing angular displacement via a torque transmitting member, a power transmission shaft connected to the inner joint member in a torque transmittable manner, and a detachable mechanism provided between the inner joint member and the power transmission shaft so as to detach the power transmission shaft from the inner joint member.

The detachable mechanism according to the present invention includes a cylindrical member externally fit onto the power transmission shaft, a fixing member accommodated to be movable in a radial direction in the cylindrical member, and an annular member disposed to be movable in an axial direction on an outer periphery of the cylindrical member.

In this detachable mechanism, the fixing member is detachable from the power transmission shaft by moving the fixing member in the cylindrical member in the radial direction by movement in the axial direction of the annular member. The attachment and detachment of the fixing member fixes and separates the power transmission shaft and the inner joint member.

As a technical measure for achieving the above-mentioned object, the present invention is characterized in that a locking claw is provided at an end of an inner joint member side of the annular member, and a locking groove is provided at an end of an annular member side of the inner joint member, and the locking claw of the annular member is fitted into the locking groove of the inner joint member.

In the present invention, with the locking claw provided at the end of the inner joint member side of the annular member, and the locking groove provided at the end of the annular member side of the inner joint member, when the power transmission shaft and the inner joint member are fixed, the locking claw of the annular member is fitted into the locking groove of the inner joint member, to thereby fix the annular member in the axial direction.

Thus, the fixing member is accommodated to be movable in the radial direction, and a shape of the cylindrical member disposed between the power transmission shaft and the annular member can be simplified. Further, since a fixing structure of the annular member in which a recessed groove is formed in the power transmission shaft and a retaining ring is fitted in the recessed groove is unnecessary, the annular member can be fixed without the retaining ring.

In the present invention, a structure is desirable in which an inclined portion is provided at the end of the annular member side of the inner joint member, so as to guide the locking claw of the annular member into the locking groove while expanding a diameter of the locking claw.

By employing such a structure, when the power transmission shaft and the inner joint member are fixed, the locking claw of the annular member is expanded in diameter along the inclined portion and finally fitted into the locking groove of the inner joint member. Thus, the annular member can be securely and easily fixed to the inner joint member.

In the present invention, a structure is desirable in which a slit portion is provided at the end of the annular member side of the inner joint member, so as to detach the locking claw of the annular member from the locking groove.

By employing such a structure, when the power transmission shaft and the inner joint member are separated from each other, the locking claw of the annular member is detached from the locking groove of the inner joint member via the slit portion, and thus the annular member can be easily separated from the inner joint member.

Advantageous Effects of Invention

According to the present invention, a detachable mechanism that detaches a power transmission shaft from an inner joint member is constituted of a cylindrical member, a fixing member, and an annular member, and thus the inner joint member and the power transmission shaft can be securely fixed and easily separated by a simple structure. Consequently, it is possible to improve the degree of freedom in designing the detachable mechanism.

Further, by fitting a locking claw of the annular member into a locking groove of the inner joint member, a shape of the cylindrical member can be simplified. Consequently, manufacture of the cylindrical member is facilitated, cost is reduced, and design for ensuring the pull-off resistance of the power transmission shaft is also facilitated.

Furthermore, a fixing structure of the annular member in which a recessed groove is formed in the power transmission shaft and a retaining ring is fitted in the recessed groove is unnecessary. Thus, the annular member can be fixed by a simple structure without the retaining ring, reduction in cost and reduction in the number of parts are facilitated, and assemblability can be improved.

DESCRIPTION OF EMBODIMENT

An embodiment of a constant velocity universal joint according to the present invention will be described below in detail with reference to the drawings.

In the following embodiment, a Rzeppa type constant velocity universal joint (BJ), which is one of fixed type constant velocity universal joints incorporated in a propeller shaft for an automobile, will be exemplified. As another fixed type constant velocity universal joint, the present invention is also applicable to undercut-free type constant velocity universal joints (UJ).

Further, the present invention is also applicable to a double offset type constant velocity universal joint (DOJ), a cross groove type constant velocity universal joint (LJ), a tripod type constant velocity universal joint (TJ), and the like as a plunging type constant velocity universal joint.

A propeller shaft incorporated in an automobile such as a 4WD vehicle or an FR vehicle needs to cope with angular displacement and axial displacement due to a change in the relative positional relationship between the transmission and the differential.

For this purpose, in general, a propeller shaft has a structure including a fixed type constant velocity universal joint that allows only angular displacement on the transmission side, and a plunging type constant velocity universal joint that allows both axial displacement and angular displacement on the differential side, in which both the constant velocity universal joints are connected by a propeller shaft made of steel.

Figure 1:
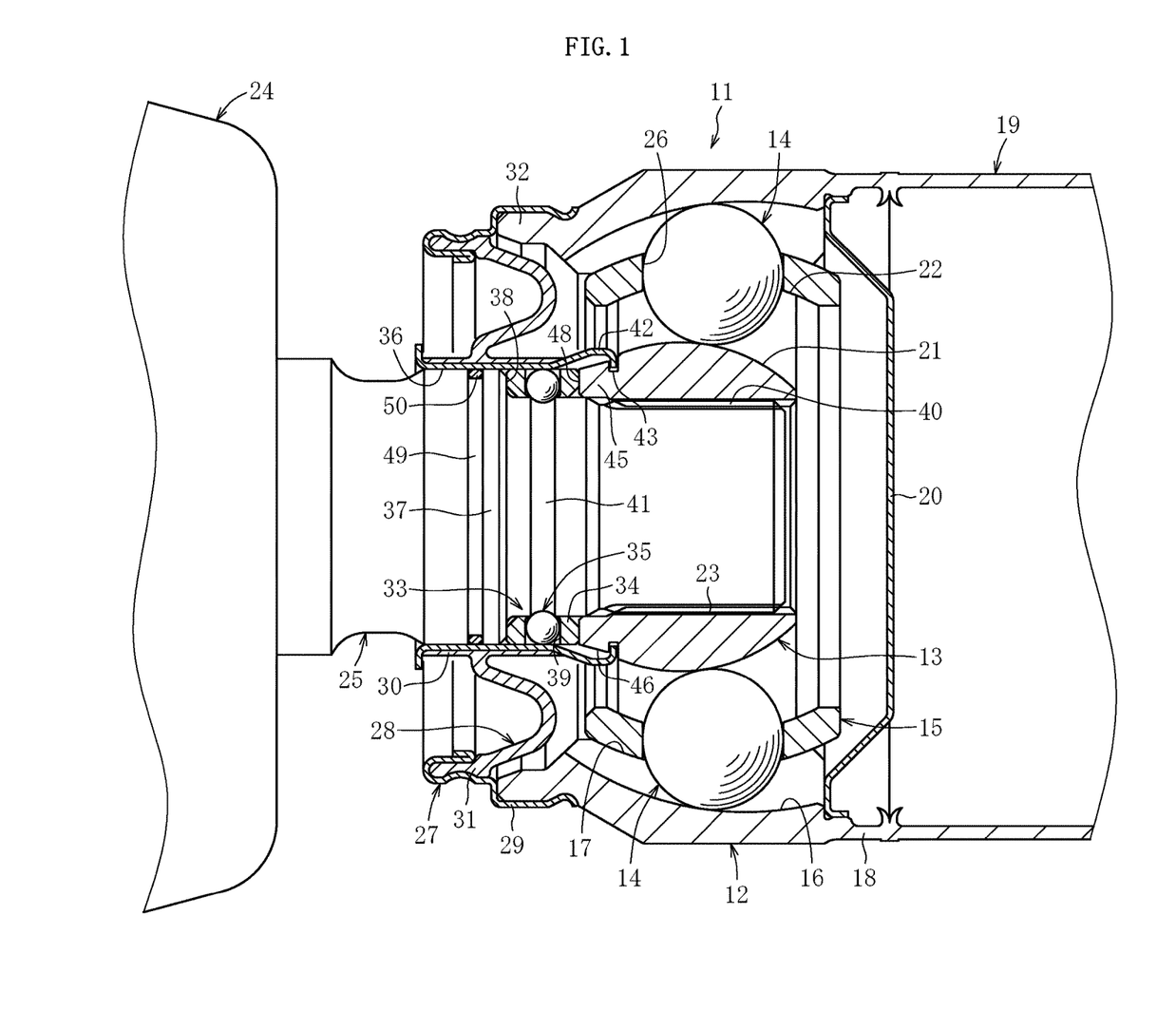
FIG. 1 is a cross-sectional view illustrating an entire configuration of a constant velocity universal joint according to an embodiment of the present invention.

As illustrated in FIG. 1, a main part of a fixed type constant velocity universal joint 11 of this embodiment (hereinafter, simply referred to as a constant velocity universal joint) is constituted of an outer joint member 12, an inner joint member 13, a plurality of balls 14 which are torque transmitting members, and a cage 15.

In the outer joint member 12, arc-shaped track grooves 16 extending in an axial direction are formed at a plurality of positions in a circumferential direction at equal intervals on a spherical inner peripheral surface 17. A pipe-shaped propeller shaft 19 is coaxially connected to one open end portion 18 of this outer joint member 12 in a torque transmittable manner by friction welding or the like. Further, a sealing plate 20 is attached to the open end portion 18 by press-fitting so as to seal a lubricant such as grease inside the outer joint member 12.

In the inner joint member 13, arc-shaped track grooves 21 extending in the axial direction in pairs with the track grooves 16 of the outer joint member 12 are formed at a plurality of positions in the circumferential direction at equal intervals on a spherical outer peripheral surface 22. A power transmission shaft 25, which is an output shaft extending from a transmission 24, is connected to a shaft hole 23 of the inner joint member 13 in a torque transmittable manner by spline fitting. The power transmission shaft 25 is detachable from the inner joint member 13 by a detachable mechanism 33.

The balls 14 are interposed between the track grooves 16 of the outer joint member 12 and the track grooves 21 of the inner joint member 13. The balls 14 transmit rotational torque between the outer joint member 12 and the inner joint member 13. The number of balls 14 may be six, eight, or any other number, and the number is arbitrary.

The cage 15 is interposed between the inner peripheral surface 17 of the outer joint member 12 and the outer peripheral surface 22 of the inner joint member 13. In the cage 15, a plurality of pockets 26 for holding the balls 14 are formed at a plurality of positions at equal intervals in the circumferential direction.

In this constant velocity universal joint 11, when an operating angle is given between the outer joint member 12 and the inner joint member 13 by the propeller shaft 19, the balls 14 held by the cage 15 are always maintained in a bisecting plane of the operating angle at any operating angle.

Consequently, constant velocity between the outer joint member 12 and the inner joint member 13 is ensured. Rotational torque is transmitted between the outer joint member 12 and the inner joint member 13 via the balls 14 in a state that the constant velocity is ensured.

This constant velocity universal joint 11 has a structure in which a sealing mechanism 27 is fitted between the outer joint member 12 and the power transmission shaft 25 in order to prevent leakage of the lubricant sealed inside the outer joint member 12 and to prevent intrusion of foreign matter from the outside.

By sealing the lubricant in an inner space of the outer joint member 12, lubricity at a sliding portion inside the joint is secured during operation in which the power transmission shaft 25 rotates at an operating angle with respect to the outer joint member 12.

Since the constant velocity universal joint 11 is incorporated into a propeller shaft, the constant velocity universal joint 11 has a high rotation speed and a small operating angle. For this reason, the above-described sealing mechanism 27 is constituted of a rubber boot 28, a metal ring 29, and an annular member 36 of the detachable mechanism 33.

The boot 28 has a small-diameter end portion 30 and a large-diameter end portion 31 and has a U-shaped folded shape in the middle. The metal ring 29 has one end fixed to an outer peripheral surface of an open end portion 32 of the outer joint member 12 by press-fitting, and the other end fixed to the large-diameter end portion 31 of the boot 28 by caulking.

The small-diameter end portion 30 of the boot 28 is integrally fixed to an annular member 36 of the detachable mechanism 33 by vulcanization bonding. This annular member 36 constitutes a part of the sealing mechanism 27 and also constitutes a part of the detachable mechanism 33.

For component replacement or maintenance and inspection of the propeller shaft to which the constant velocity universal joint 11 is assembled, the detachable mechanism 33 for detaching the constant velocity universal joint 11 from the power transmission shaft 25 of the transmission 24 is necessary. The constant velocity universal joint 11 of this embodiment includes the detachable mechanism 33 having a structure as follows.

As illustrated in FIG. 1, the detachable mechanism 33 of this embodiment is provided between the inner joint member 13 of the constant velocity universal joint 11 and the power transmission shaft 25 of the transmission 24, and has a main part constituted of a cylindrical member 34, a plurality of spheres 35 which are fixing members, and the annular member 36.

Thus, with a simple structure including the cylindrical member 34, the spheres 35, and the annular member 36, the inner joint member 13 and the power transmission shaft 25 can be securely fixed and easily separated. Consequently, the degree of freedom in design of the detachable mechanism 33 can be improved.

The cylindrical member 34 is externally fit onto the power transmission shaft 25. The cylindrical member 34 may be made of either metal or resin. Since the cylindrical member 34 has a simple cylindrical shape, when it is made of metal, its processing cost can be reduced, and when it is made of resin, it is easy to design for ensuring pull-off resistance of the power transmission shaft 25.

In a state that the cylindrical member 34 is externally fitted onto the power transmission shaft 25, an axial position of the cylindrical member 34 is restricted by being sandwiched between a transmission-side end surface 48 of the inner joint member 13 and a stepped surface 38 of a large-diameter portion 37 of the power transmission shaft 25.

At a plurality of positions in the circumferential direction of the cylindrical member 34, through holes 39 are formed to open in inner and outer peripheries of the cylindrical member 34, and the spheres 35 are accommodated in the through holes 39 to be movable in a radial direction. Movement of the spheres 35 in a radial direction allows the spheres 35 to protrude from and retract in inner peripheral openings of the through holes 39.

On the other hand, in an outer peripheral surface between a spline fitting portion 40 and the large-diameter portion 37 of the power transmission shaft 25, an annular recessed groove 41 is formed to correspond with axial positions of the through holes 39 of the cylindrical member 34, and the cylindrical member 34 is locked to the power transmission shaft 25 by fitting the spheres 35 into the recessed groove 41.

The number of the spheres 35 accommodated in the through holes 39 of the cylindrical member 34 may be appropriately set according to a fixing force required for locking the cylindrical member 34 to the power transmission shaft 25.

As described above, by accommodating the spheres 35 in the through holes 39 of the cylindrical member 34, when the power transmission shaft 25 and the inner joint member 13 are fixed, the power transmission shaft 25 is restrained by the spheres 35 by radially inward movement of the spheres 35. Further, when the power transmission shaft 25 and the inner joint member 13 are separated, restraint of the power transmission shaft 25 by the spheres 35 is released by radially outward movement of the spheres 35.

In a state that radially outward movement of the spheres 35 is restrained by the annular member 36, the spheres 35 protrude from the inner peripheral surface of the cylindrical member 34. In this state, the cylindrical member 34 is locked to the power transmission shaft 25 by fitting the spheres 35 into the recessed groove 41 of the power transmission shaft 25. When the restrained state of the radially outward movement of the spheres 35 by the annular member 36 is released, the spheres 35 do not protrude from the inner peripheral surface of the cylindrical member 34.

The annular member 36 is disposed to be movable in an axial direction on outer peripheral surfaces of the large-diameter portion 37 of the power transmission shaft 25 and the cylindrical member 34. As described above, the small-diameter end portion 30 of the boot 28 is integrally fixed onto an outer peripheral surface of the annular member 36 by vulcanization bonding.

Locking claws 42 are provided at an end of an inner joint member side of the annular member 36, and a locking groove 43 is provided at an end of an annular member side of the inner joint member 13, and the locking claws 42 of the annular member 36 are fitted into the locking groove 43 of the inner joint member 13, thereby connecting the annular member 36 and the inner joint member 13.

The annular member 36 includes a cylindrical portion and an arc-shaped portion, the cylindrical portion is a portion that moves in the axial direction on the outer peripheral surfaces of the large-diameter portion 37 of the power transmission shaft 25 and the cylindrical member 34, and the arc-shaped portion includes the locking claws 42 whose distal ends fit into the locking groove 43 of the inner joint member 13.

As described above, by fitting the locking claws 42 of the annular member 36 into the locking groove 43 of the inner joint member 13, the conventional structure in which a recessed groove is formed in the power transmission shaft 25 and a retaining ring is fitted into the recessed groove is unnecessary. Consequently, the annular member 36 can be fixed by a simple structure without a retaining ring, reduction in cost and reduction in the number of parts are facilitated, and assemblability can be improved.

Figure 2:
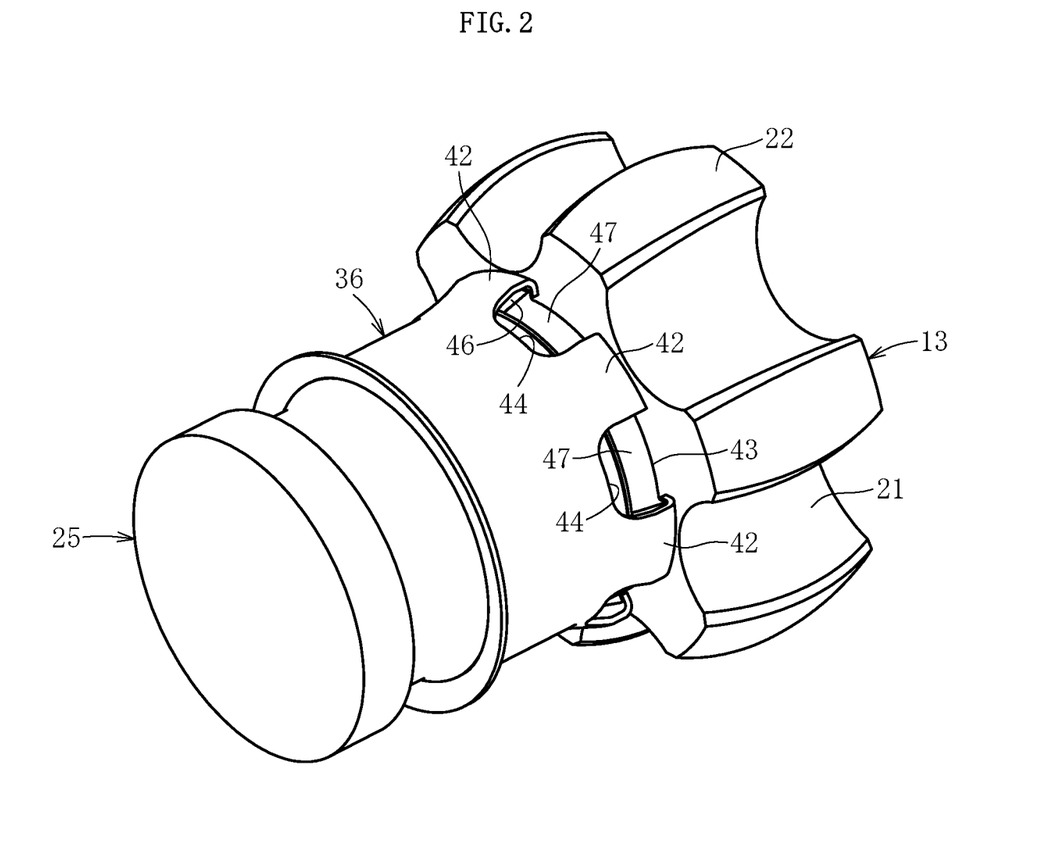
FIG. 2 is a perspective view illustrating a power transmission shaft, an annular member, and an inner joint member of FIG. 1.

As illustrated in FIG. 2, the locking claws 42 extend at a plurality of positions in the circumferential direction at the end of the inner joint member side of the annular member 36, and distal ends thereof are bent radially inward so as to be fitted into the locking groove 43 of the inner joint member 13. A cutout opening 44 is provided between locking claws 42 adjacent in the circumferential direction.

The number of locking claws 42 of the annular member 36 and the number of spheres 35 of the cylindrical member 34 are the same, and in a state that the locking claws 42 of the annular member 36 are fitted into the locking groove 43 of the inner joint member 13, circumferential phases of the locking claws 42 and the spheres 35 match with each other.

Figure 3:
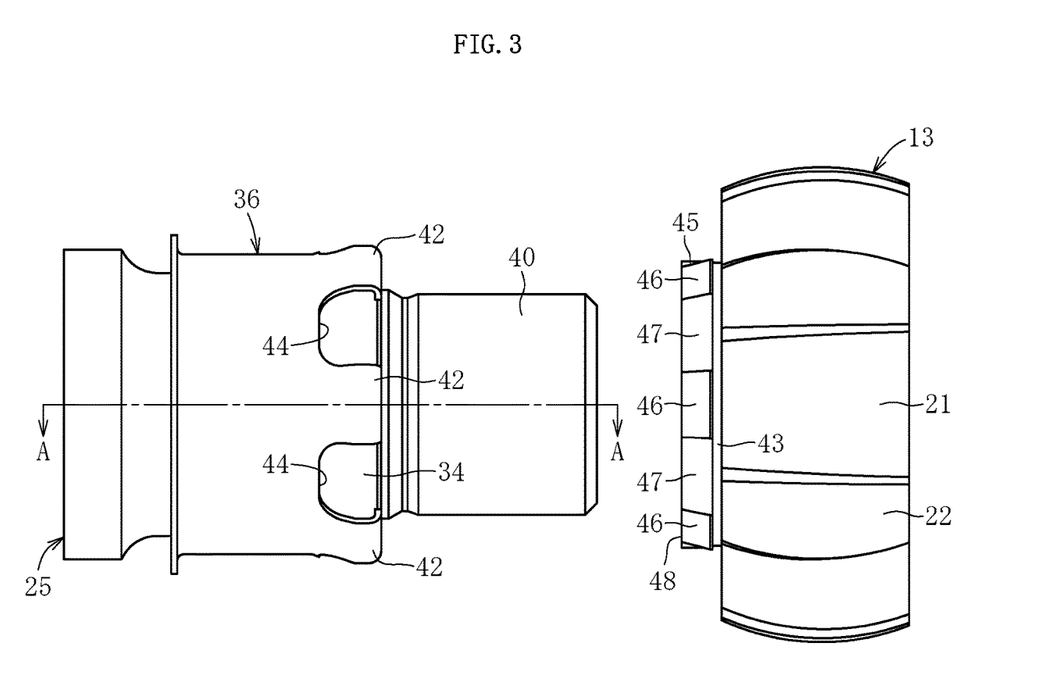
FIG. 3 is a front view illustrating a state before the power transmission shaft is inserted into the inner joint member.

On the other hand, as illustrated in FIG. 3, a projecting portion 45 is integrally provided at the end of the annular member side of the inner joint member 13. The above-described locking groove 43 is formed in an annular shape in a base portion of the projecting portion 45.

The projecting portion 45 is provided with the same number of inclined portions 46 as the locking claws 42 of the annular member 36 along a circumferential direction thereof. The inclined portions 46 are formed so as to expand in diameter from the transmission side toward the propeller shaft side so as to guide the locking claws 42 of the annular member 36 into the locking groove 43 while expanding a diameter of the locking claws 42 (see FIG. 1).

Further, between the inclined portions 46 adjacent in the circumferential direction, the same number of slit portions 47 as the locking claws 42 of the annular member 36 are provided along the circumferential direction. The slit portions 47 are formed in a recessed step shape so as to have a smaller diameter than the inclined portions 46 in order to detach the locking claws 42 of the annular member 36 from the locking groove 43 (see FIGS. 8 and 10).

As illustrated in FIG. 1, an annular recessed groove 49 is formed in the outer peripheral surface of the large-diameter portion 37 of the power transmission shaft 25, and an O-ring 50 is fitted into the recessed groove 49. The cylindrical portion of the annular member 36 is externally fitted onto the outer peripheral surface of the large-diameter portion 37 of the power transmission shaft 25 with this O-ring 50 interposed therebetween.

The annular member 36 not only has a detachable function by the detachable mechanism 33 for fixing and separating the power transmission shaft 25 and the inner joint member 13, but also has a sealing function by the sealing mechanism 27 together with the O-ring 50, for preventing leakage of a lubricant sealed inside the joint, and preventing intrusion of foreign matter from outside the joint.

By the above configuration, that is, the detachable mechanism 33 including the cylindrical member 34, the spheres 35, and the annular member 36, the power transmission shaft 25 and the inner joint member 13 are fixed and separated in the following manner illustrated in FIGS. 3 to 12.

Note that in FIGS. 3 to 12, only the inner joint member 13 of the constant velocity universal joint 11 is illustrated, and other components including the balls 14 and the cage 15 are not illustrated. Further, in the annular member 36 of the detachable mechanism 33, the small-diameter end portion 30 (see FIG. 1) of the boot 28 is not illustrated.

Fixing of the power transmission shaft 25 and the inner joint member 13 is performed as follows.

Figure 4:
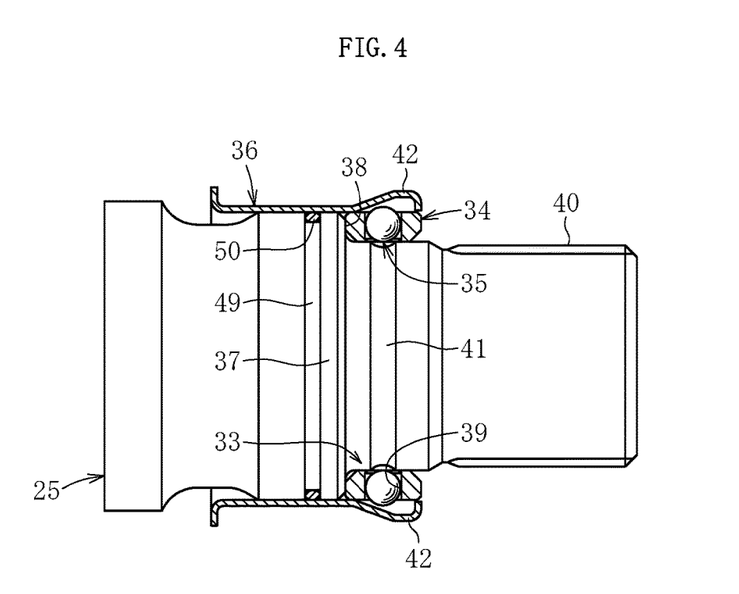
FIG. 4 is a cross-sectional view taken along line A-A in FIG. 3.

First, as illustrated in FIGS. 3 and 4, the cylindrical member 34 is externally fit onto the outer peripheral surface between the large-diameter portion 37 of the power transmission shaft 25 and the spline fitting portion 40. The spheres 35 are accommodated in the through holes 39 of the cylindrical member 34, and in this state, the annular member 36 is externally fit onto the outer peripheral surfaces of the large-diameter portion 37 of the power transmission shaft 25 and the cylindrical member 34.

At this time, the circumferential phases of the locking claws 42 of the annular member 36 and the spheres 35 in the through holes 39 of the cylindrical member 34 match with each other. In this state, the spheres 35 are disposed inside the locking claws 42 of the annular member 36, and outward movement in the radial direction is not restrained by the annular member 36. That is, the spheres 35 do not protrude from the inner peripheral surface of the cylindrical member 34.

Figure 5:
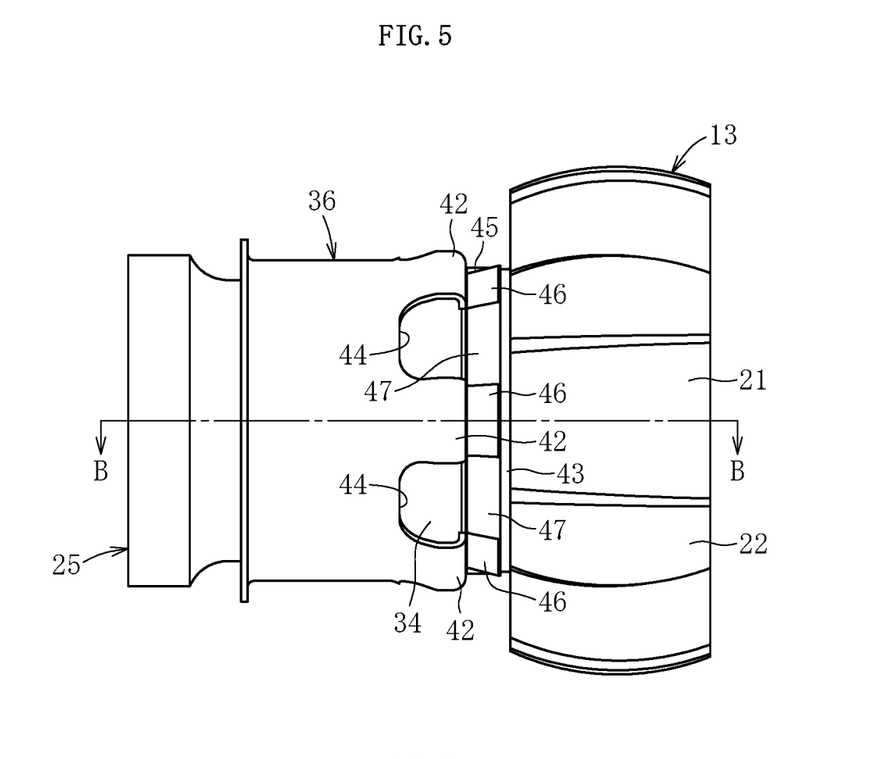
FIG. 5 is a front view illustrating a state before locking claws of the annular member are fitted into a locking groove of the inner joint member.
Figure 6:
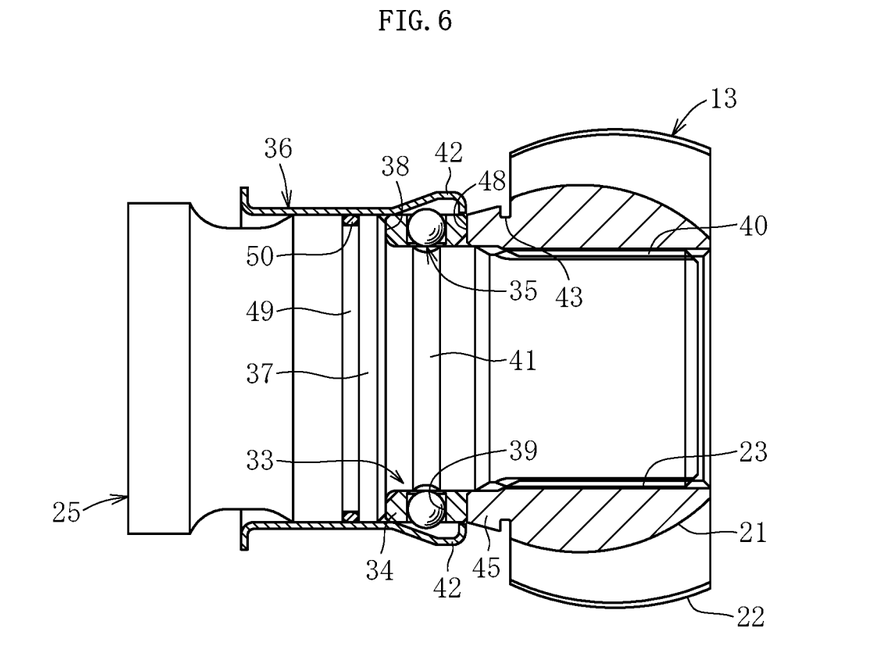
FIG. 6 is a cross-sectional view taken along line B-B in FIG. 5.

Next, as illustrated in FIGS. 5 and 6, the spline fitting portion 40 of the power transmission shaft 25 is inserted into the shaft hole 23 of the inner joint member 13 so as to connect the inner joint member 13 and the power transmission shaft 25 in a torque transmittable manner. At this time, the cylindrical member 34 is sandwiched between the stepped surface 38 of the large-diameter portion 37 of the power transmission shaft 25 and the end surface 48 of the projecting portion 45 of the inner joint member 13, and an axial position of the cylindrical member 34 is restricted.

Figure 7:
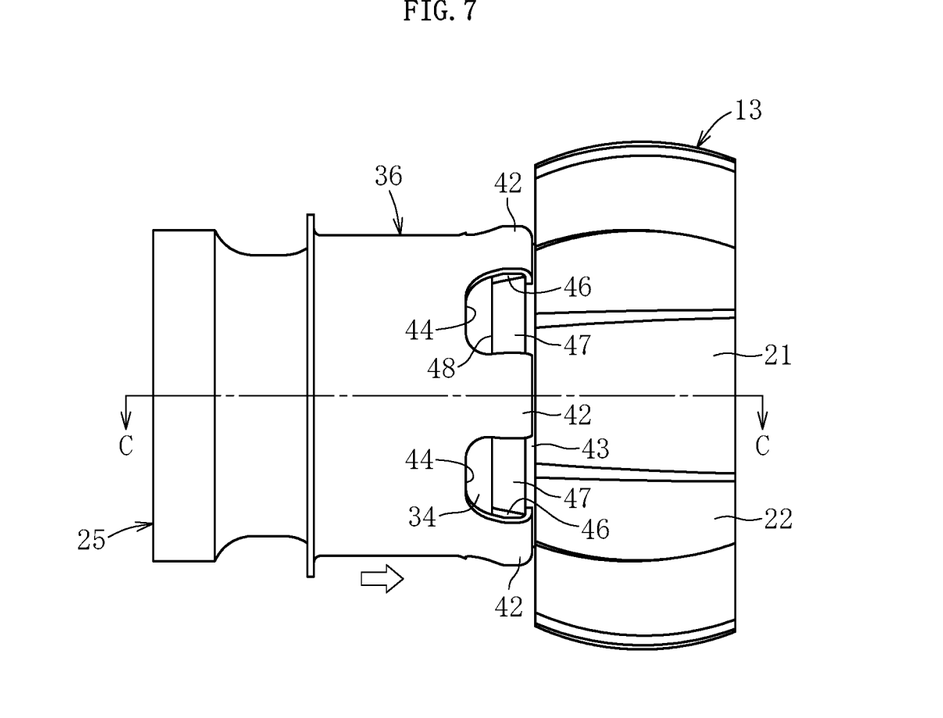
FIG. 7 is a front view illustrating a state after the locking claws of the annular member are fitted into the locking groove of the inner joint member.
Figure 8:
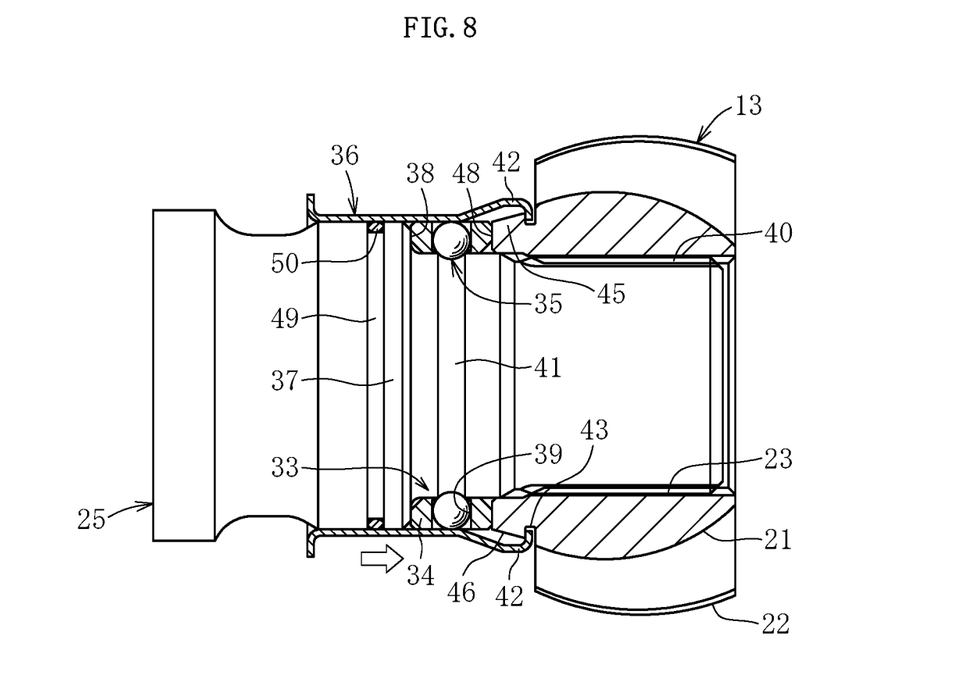
FIG. 8 is a cross-sectional view taken along line C-C in FIG. 7.

From this state, as illustrated in FIGS. 7 and 8, the annular member 36 is slid toward the inner joint member 13 (see white arrows in the drawings). Due to this movement in the axial direction of the annular member 36, the locking claws 42 of the annular member 36 is finally guided into the locking groove 43 while expanding the diameter of the locking claws 42 along the inclined portions 46 of the projecting portion 45 of the inner joint member 13 by elastic deformation. The locking claws 42 of the annular member 36 fit into the locking groove 43 of the inner joint member 13 by elastic restoring force.

Once the locking claws 42 of the annular member 36 fit into the locking groove 43 of the inner joint member 13, the spheres 35 are in a restrained state from moving radially outward by the annular member 36. In this manner, the spheres 35 move radially inward in the through holes 39 of the cylindrical member 34, to thereby protrude from the inner peripheral surface of the cylindrical member 34 and fit into the recessed groove 41 of the power transmission shaft 25.

As a result, the spheres 35 of the cylindrical member 34 are locked in the recessed groove 41 of the power transmission shaft 25 by the annular member 36. That is, the power transmission shaft 25 and the inner joint member 13 are fixed by the spheres 35 with the cylindrical member 34 interposed therebetween.

On the other hand, separation between the power transmission shaft 25 and the inner joint member 13 is performed as follows.

Figure 9:
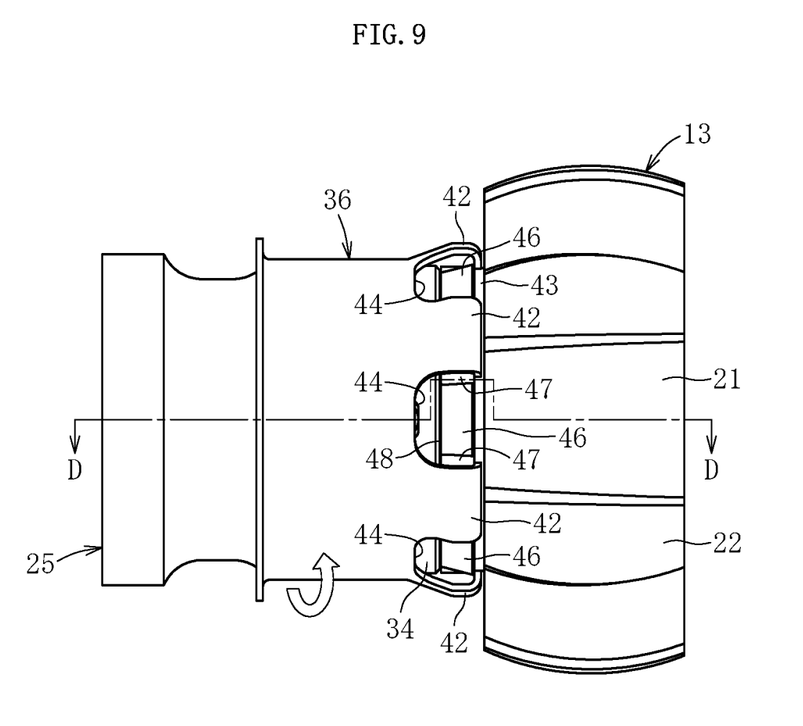
FIG. 9 is a front view illustrating a state in which the locking claws of the annular member are arranged in slit portions of the inner joint member.
Figure 10:
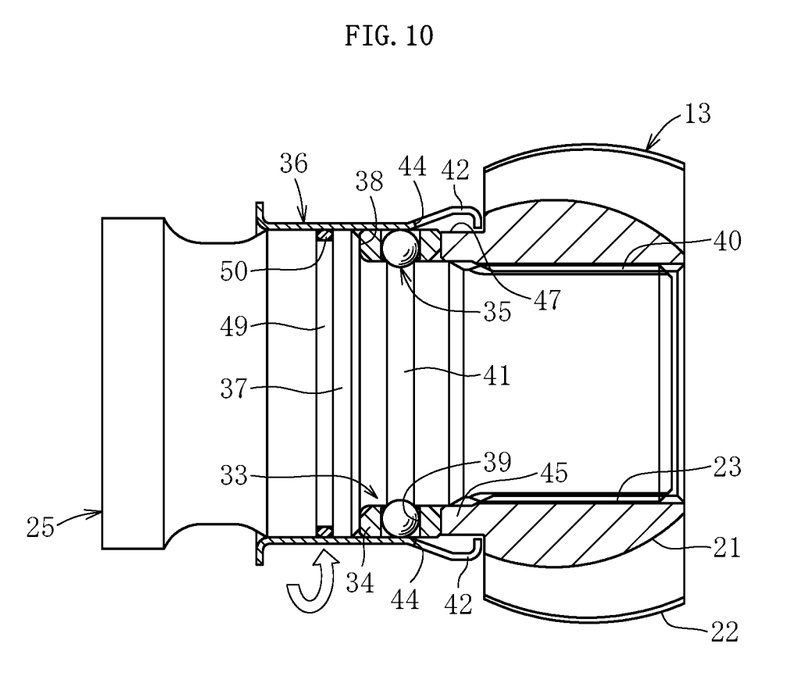
FIG. 10 is a cross-sectional view taken along line D-D in FIG. 9.

First, as illustrated in FIGS. 9 and 10, the annular member 36 is rotated in a circumferential direction with respect to the inner joint member 13 (see white arrows in the drawings). By this rotation, the locking claws 42 of the annular member 36 are positioned at the slit portions 47 of the projecting portion 45 of the inner joint member 13.

This rotation of the annular member 36 makes the annular member 36 movable in an axial direction. In this state, as illustrated in FIGS. 11 and 12, the annular member 36 is slid toward the transmission (left side in the drawings) (see white arrows in the drawings).

Due to this movement in the axial direction of the annular member 36, the spheres 35 whose radially outward movement has been restrained by the annular member 36 are released through the openings 44 located among the locking claws 42 of the annular member 36. That is, the spheres 35 are in a state that radially outward movement is not restrained by the openings 44 of the annular member 36.

In this manner, the state that the spheres 35 of the cylindrical member 34 are locked in the recessed groove 41 of the power transmission shaft 25 is released. From this state, by pulling out the spline fitting portion 40 of the power transmission shaft 25 from the shaft hole 23 of the inner joint member 13, the power transmission shaft 25 and the inner joint member 13 are separated.

Figure 11:
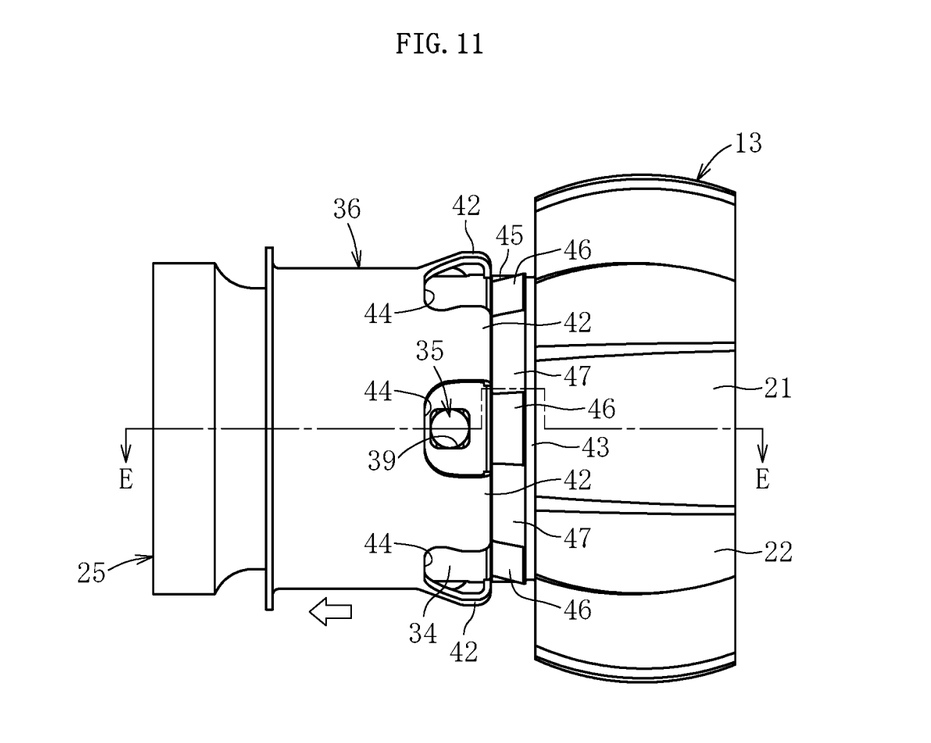
FIG. 11 is a front view illustrating a state in which the locking claws of the annular member are pulled out via the slit portions of the inner joint member.
Figure 12:
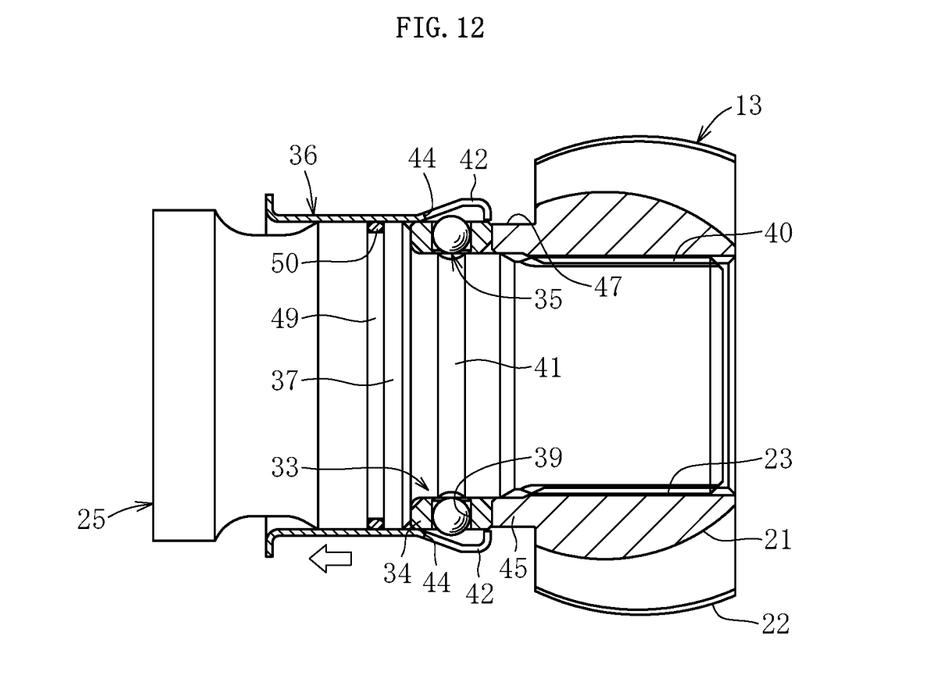
FIG. 12 is a cross-sectional view taken along line E-E in FIG. 11.

Note that if a structure in which outer peripheral side openings of the through holes 39 of the cylindrical member 34 are reduced in diameter to have inner diameters slightly smaller than outer diameters of the spheres 35, when the spheres 35 are in a state illustrated in FIGS. 11 and 12, it is possible to prevent the spheres 35 from falling out of the through holes 39 of the cylindrical member 34 to the outside.

The present invention is not limited to the above-described embodiment at all, and it is needless to mention that the present invention can be embodied in various forms without departing from the gist of the present invention. The scope of the present invention is described in the claims and includes equivalent meanings described in the claims and all changes within the scope.

The invention claimed is:

1. A constant velocity universal joint comprising:
an outer joint member;
an inner joint member that transmits torque with the outer joint member while allowing angular displacement via a torque transmitting member;
a power transmission shaft connected to the inner joint member in a torque transmittable manner; and
a detachable mechanism provided between the inner joint member and the power transmission shaft so as to detach the power transmission shaft from the inner joint member, wherein
the detachable mechanism includes a cylindrical member externally fit onto the power transmission shaft, a fixing member accommodated to be movable in a radial direction in the cylindrical member, and an annular member disposed to be movable in an axial direction on an outer periphery of the cylindrical member,
a locking claw is provided at an end of an inner joint member side of the annular member, and a locking groove is provided at an end of an annular member side of the inner joint member, and the locking claw of the annular member is fitted into the locking groove of the inner joint member, and
an inclined portion is provided at the end of the annular member side of the inner joint member, so as to guide the locking claw of the annular member into the locking groove while expanding a diameter of the locking claw.

2. The constant velocity universal joint according to claim 1, wherein a slit portion is provided at the end of the annular member side of the inner joint member, so as to detach the locking claw of the annular member from the locking groove.

3. A constant velocity universal joint comprising:
an outer joint member;
an inner joint member that transmits torque with the outer joint member while allowing angular displacement via a torque transmitting member;
a power transmission shaft connected to the inner joint member in a torque transmittable manner; and
a detachable mechanism provided between the inner joint member and the power transmission shaft so as to detach the power transmission shaft from the inner joint member, wherein the detachable mechanism includes a cylindrical member externally fit onto the power transmission shaft, a fixing member accommodated to be movable in a radial direction in the cylindrical member, and an annular member disposed to be movable in an axial direction on an outer periphery of the cylindrical member, a locking claw is provided at an end of an inner joint member side of the annular member, and a locking groove is provided at an end of an annular member side of the inner joint member, and the locking claw of the annular member is fitted into the locking groove of the inner joint member, the annular member is provided with a portion that restrains radially outward movement of the fixing member and a portion that permits the radially outward movement of the fixing member, a state in which the radially outward movement of the fixing member is restrained and a state in which the radially outward movement of the fixing member is permitted are switched by axial movement of the annular member, and when the radially outward movement of the fixing member is restrained by the annular member, the fixing member is engaged with the power transmission shaft.

4. The constant velocity universal joint according to claim 3, wherein an inclined portion is provided at the end of the annular member side of the inner joint member, so as to guide the locking claw of the annular member into the locking groove while expanding a diameter of the locking claw.

5. The constant velocity universal joint according to claim 4, wherein a slit portion is provided at the end of the annular member side of the inner joint member, so as to detach the locking claw of the annular member from the locking groove.

6. The constant velocity universal joint according to claim 3, wherein a slit portion is provided at the end of the annular member side of the inner joint member, so as to detach the locking claw of the annular member from the locking groove.

* * * * *